United States Patent
Tang et al.

(10) Patent No.: US 11,537,626 B2
(45) Date of Patent: Dec. 27, 2022

(54) FULL-TEXT FUZZY SEARCH METHOD FOR SIMILAR-FORM CHINESE CHARACTERS IN CIPHERTEXT DOMAIN

(71) Applicant: SOUTH CHINA UNIVERSITY OF TECHNOLOGY, Guangzhou (CN)

(72) Inventors: Shaohua Tang, Guangzhou (CN); Bowen Zhao, Guangzhou (CN); Yiming Wu, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 114 days.

(21) Appl. No.: 16/967,739

(22) PCT Filed: Nov. 9, 2018

(86) PCT No.: PCT/CN2018/114868
§ 371 (c)(1),
(2) Date: Aug. 6, 2020

(87) PCT Pub. No.: WO2019/153813
PCT Pub. Date: Aug. 15, 2019

(65) Prior Publication Data
US 2020/0372023 A1 Nov. 26, 2020

(30) Foreign Application Priority Data

Feb. 7, 2018 (CN) .......................... 201810121448.7

(51) Int. Cl.
*G06F 16/24* (2019.01)
*G06F 16/2458* (2019.01)
(Continued)

(52) U.S. Cl.
CPC ...... *G06F 16/2468* (2019.01); *G06F 16/2228* (2019.01); *G06F 21/6218* (2013.01)

(58) Field of Classification Search
CPC ............. G06F 16/901; G06F 16/90335; G06F 16/2455; G06F 16/8373; G06F 16/245;
(Continued)

(56) References Cited

U.S. PATENT DOCUMENTS

| 5,706,497 A | 1/1998 | Takahashi et al. |
| 2008/0077570 A1* | 3/2008 | Tang .................... G06F 16/3346 |
| 2009/0300351 A1* | 12/2009 | Lei ......................... G06F 16/951 |
| | | 713/165 |

FOREIGN PATENT DOCUMENTS

| CN | 103955537 | 7/2014 |
| CN | 106997384 | 8/2017 |
| CN | 108334612 | 7/2018 |

OTHER PUBLICATIONS

"Lucence Chinese word segmentation iK Analyzer", Developer on Alibaba Cloud, Aug. 1, 2018.*

* cited by examiner

*Primary Examiner* — Cindy Nguyen
(74) *Attorney, Agent, or Firm* — JMB Davis Ben-David

(57) ABSTRACT

The invention discloses a full-text fuzzy search method for similar-form Chinese characters in a ciphertext domain. The method realises a fuzzy search in the Chinese ciphertext domain based on a symmetric searchable encryption scheme and an inverted index structure, supports a fuzzy search on Chinese characters having similar glyphs in ciphertext status, ensures that searching results are ordered, and supports a multi-keyword logical connection fuzzy search. The present invention uses a distributed search engine Lucene and a Chinese word segmentator IKAnalyzer to perform full-text word segmentation on a document and constructs a plaintext inverted index comprising similar-form Chinese characters by means of the established similar-form character library of 3,755 commonly used Chinese characters. Considering the (Continued)

security of the inverted index structure, each keyword in the plaintext inverted index and its corresponding document number are constructed in an encrypted chain form, and a B+ tree structure is used to speed up the search. The invention realizes a fuzzy search in a Chinese full-text ciphertext domain in a semi-trusted cloud server without false detection and missed detection.

5 Claims, 2 Drawing Sheets

(51) Int. Cl.
*G06F 16/22* (2019.01)
*G06F 21/62* (2013.01)
(58) Field of Classification Search
CPC ...... G06F 16/24; G06F 16/319; G06F 16/322; G06F 16/33; G06F 16/2468; G06F 16/2228; G06F 21/6218; G06F 21/6227; G06F 40/242; G06F 40/279; G06F 40/289; H04L 9/0894; H04L 63/0435; H04L 63/08
See application file for complete search history.

FULL-TEXT FUZZY SEARCH METHOD FOR SIMILAR-FORM CHINESE CHARACTERS IN CIPHERTEXT DOMAIN

CROSS-REFERENCE TO RELATED APPLICATIONS

This is the U.S. National Stage of International Patent Application No. PCT/CN2018/114868 filed on Nov. 9, 2018, which was published in Chinese under PCT Article 21(2), and which in turn claims the benefit of Chinese Patent Application No. 201810121448.7 filed on Feb. 7, 2018.

FIELD OF THE INVENTION

The invention relates to the technical field of information security, in particular to a full-text fuzzy search method for similar-form Chinese characters in the ciphertext domain.

BACKGROUND OF THE INVENTION

In recent years, with the development of cloud storage technologies with on-demand services and high scalability, data owners are increasingly outsourcing data storage to cloud servers.

While cloud storage services bring great convenience to data owners, they also present corresponding data security challenges. Especially when the data stored on the cloud server involves the confidentiality and privacy of the data owner, if the data stored on the cloud server is subjected to internal or external attacks, it is easy to cause data leakage and endanger the data security of the data owner. This situation can cause significant economic losses for both the data owner and the cloud storage service provider.

In order to ensure the security of the data, the data owner usually encrypts the data and uploads it to the cloud server. When the amount of uploaded data is large, symmetric encryption algorithms are suitable and available. However, a traditional symmetric encryption algorithm does not support data search in the ciphertext domain, that is, data encryption affects the availability of data. Symmetric searchable encryption is a method that allows users to search encrypted data. This method requires the user to accurately input the keyword to be queried, and the cloud server returns the matched file to the user; but in the real world, due to the ubiquitous similar-form Chinese characters, it's common for users to type in typos. Therefore, fuzzy search on encrypted data becomes a basic requirement in searchable encryption. Existing fuzzy searchable ciphertext schemes for Chinese characters mainly use the letter similarity of Chinese pinyin to realize fuzzy search. Since there are multiple phonetic characters in Chinese characters, that is, a same pinyin may correspond to multiple Chinese characters. When generating a search trapdoor, whether the input Chinese character is converted to pinyin or the search trapdoor is directly constructed with pinyin, it will affect the semantic information of search keywords, thus fuzzy search based on pinyin will affect the accuracy of search results. On the other hand, fuzzy search based on similar-form Chinese characters preserves the semantic information of search keywords well, which is a more accurate method of fuzzy search.

SUMMARY OF THE INVENTION

The object of the present invention is to provide a full-text fuzzy search method for similar-form Chinese characters in the ciphertext domain, which aims to address the low usability of Chinese fuzzy search design. The invention proposes a full-text fuzzy search scheme for Chinese characters in the ciphertext domain in a semi-trusted cloud server, based on the symmetric searchable encryption and constructed similar-form character library. Under non-secure channel, the scheme supports ciphertext search function based on symmetric searchable encryption scheme, order-preserving fuzzy keyword search for Chinese ciphertext, and multi-keyword Chinese ciphertext search.

The object of the present invention can be achieved by adopting the following technical solutions:

A full-text fuzzy search method for similar-form Chinese characters in the ciphertext domain, the method comprises the following steps:

S1, generate the inverted index, use the distributed search engine Lucene and the Chinese word segmentator IKAnalyzer to perform full-text segmentation on the uploaded document set, obtain the plaintext inverted index of the set of documents to be uploaded, construct the similar-form Chinese character dictionary library by analysing the commonly used Chinese characters, and use the similar-form Chinese character dictionary library to expand the plaintext inverted index of the set of documents to be uploaded;

S2, data encryption, given the security parameter k, the data owner establishes the searchable encryption key $K_{index}=(K_1,K_2)$ according to the security parameter k, to encrypt and construct the ciphertext index; establish the symmetric encryption key $K_{enc}$ to encrypt documents to be uploaded; use the searchable encryption key $K_{index}$ to encrypt the inverted index obtained in step 2, and use the symmetric encryption key $K_{enc}$ to encrypt documents to be uploaded;

S3, user authorization, the data owner divides the searchable encryption key $K_{index}$ into $(K_u, P_u)$, sends $K_u$ to authorized users, and uses $P_u$ as a server verification parameter to complete user authorization;

S4, search documents, the user takes the key group $K_u$ and the keyword w to be search as input, generates the search trapdoor, and submits the search trapdoor to the cloud server; the cloud server verifies the trapdoor by encrypting the ciphertext index, and returned to the user the document sequence corresponding to matched encrypted documents and fuzzy keywords, if similar-form words of the retrieve keyword are included in the document set, the document containing the search keywords will be ranked before a document with its similar-form words in search results.

Further, the process of step S1 is as follows:

S11, establish the unique identifier set $FILE(flie_1, flie_2, \ldots, flie_n)$ of documents to be uploaded, where n represents the number of documents to be uploaded;

S12, use the distributed search engine Lucene and the Chinese word segmentator IKAnalyzer to perform full-text segmentation and filtering on the uploaded document set, and the result of the word segmentation result is $(w_1', w_2', \ldots, w_p')$, where p is the length of the inverted index, each document set is the inverted index $EnIndex_{file}=(w_1', w_2', \ldots, w_p')$;

S13, collect 3755 commonly used Chinese characters, establish a commonly used Chinese character dictionary, and expand it into a similar-form Chinese character dictionary library DICT by collecting and analysing the commonly used similar-form Chinese characters;

S14, traverse the keyword w' in the inverted index, if the keyword has the similar-form word, expand the w' to $w=(w', w^1, w^2, \ldots, w^m)$ by using DICT, where $(w^1, w^2, \ldots, w^m)$ is the set of similar-form words of w', m represents the number of similar-form words of w; if w' does not have a similar-form word, then w=w';

S15, update the plaintext inverted index as EnIndex$_{file}$=(w$_1$, w$_2$, ..., w$_p$).

Further, the process of step S2 is as follows:

S21, given the security parameter k, according to the security parameter k, the data owner randomly generates the k-bit searchable encryption key K$_{index}$=(K$_1$, K$_2$) and the symmetric encryption key K$_{enc}$ locally;

S22, encrypt the generated inverted index EnIndex$_{file}$=(w$_1$, w$_2$, ..., w$_p$) as the index keyword by using K$_{index}$, and the encryption of the index uses the chain structure;

$$w \to Enc(\text{flie}_1) \to Enc(\text{flie}_2) \to \ldots \to Enc(\text{flie}_x),$$

when w=(w', w$^1$, w$^2$, ..., w$^m$) is a set of multiple similar-form words, for each similar-form word, firstly link the document corresponding to the word, and then sequentially link documents corresponding to other words, which ultimately generates the encrypted ciphertext index for all index keywords;

S23, perform symmetric encryption operation on all the documents to be uploaded by using the symmetric encryption algorithm, and the symmetric encryption key is K$_{ene}$, use the unique identifier set FILE(flie$_1$, flie$_2$, ..., flie$_n$) to correspond to the ciphertext document, and then construct a B+ tree as the index into the unique identifier of the ciphertext document.

Further, the process of step S3 is as follows:

S31, the data owner divides K$_{index}$ into the user key group K$_u$ and the server verification parameter P$_u$ by the exclusive OR operation;

S32, the data owner sends the user key group K$_u$ to the authorized user, the authorized user generates the search trapdoor by using the key group K$_u$ and the search keyword w, and the data owner sends the server verification parameter P$_u$ to the cloud server, in order to verify the correctness of the user's search trapdoor;

S33, when the data owner revokes the authority, requests to the server to delete the authentication parameter P$_u$, at this time the search trapdoor generated using the user key group K$_u$ whose authorisation is revoked will be invalidated.

Further, the process of step S4 is as follows:

S41, the authorized user generates the search trapdoor by using the key group K$_u$ and the search keyword w, and submits the trapdoor to the cloud server;

S42, the cloud server uses the verification parameter P$_u$ to XOR the search trapdoor, the XOR result matches the searchable ciphertext index, and the matching result is calculated to obtain the ciphertext unique identifier set (flie$_1$, flie$_2$, ..., flie$_i$), where i represents the number of files corresponding to the keyword, searches for the specified identifier in the B+ tree to obtain the encrypted document set, and returns the encrypted document to the authorized user.

The present invention has the following advantages and effects over the prior art:

(1) The present invention proposes a new keyword expansion method. Constructing similar-form sets based on the basic composition of language vocabulary. Only the similar-form keywords are extended by the similar-form sets, which reduces the number of extended keywords, thereby reducing the storage cost of the index.

(2) The present invention maintains the semantics of search keywords. The scheme is based on extended keywords of the similar-form set, which only extends the misspelled keywords and does not change the semantics of the keywords.

(3) The present invention ensures that the search results are in order. When searching submitted keyword is meaningful, firstly output the document corresponding to the keyword, and then output the document corresponding to similar-form words of the keyword, thereby ensuring the order of the result.

(4) The present invention realizes search with zero false detection rate. The scheme uses the method of extending keywords to realize fuzzy search. The search is an exact match to the ciphertext, and there is no false detection rate.

(5) The present invention is applicable to any language. The scheme can realize fuzzy search for any misspelling in any language, and this fuzzy search can guarantee the semantics of search keywords.

DETAILED DESCRIPTION OF THE PREFERRED EMBODIMENTS

In order to make the objects, technical solutions and advantages of the embodiments of the present invention clearer, the technical solutions in the embodiments of the present invention will be clearly and completely described in conjunction with the drawings in the embodiments of the present invention. Obviously, the described embodiments It is a part, but not all, of the embodiments of the present invention. Based on the embodiments of the present invention, all other embodiments obtained by those skilled in the art without creative efforts are within the scope of the present invention.

EMBODIMENTS

This embodiment discloses a full-text fuzzy search method for similar-form Chinese characters in the ciphertext domain and proposes a full-text fuzzy search scheme for Chinese characters in the ciphertext domain in a semi-trusted cloud server, based on the symmetric searchable encryption and constructed similar-form character library; under non-secure channel, the scheme supports ciphertext search function based on symmetric searchable encryption scheme, order-preserving fuzzy keyword search for Chinese ciphertext, and multi-keyword Chinese ciphertext search;

First, the data owner needs to construct a dictionary of similar-form Chinese characters and generate the keys needed for initialization, and then establish a plaintext inverted index for the documents that need to be uploaded to the cloud service, reconstruct the plaintext inverted index using the existing similar-form character dictionary, and finally encrypt the plaintext inverted index and the set of documents to be uploaded, and upload the encrypted index and the set of documents to the semi-trusted cloud server;

The second part is the search part; authorized users generate search trapdoors through their authorized key groups and search keywords w and upload the search trapdoors to the cloud server through user query requests; the cloud server will perform calculation operations on the trapdoors and will match and iterate the calculated result and the encrypted index, and the obtained document set is finally returned to the requesting user;

Finally, the user uses the document key to decrypt the content of the plaintext document.

Figure 1:
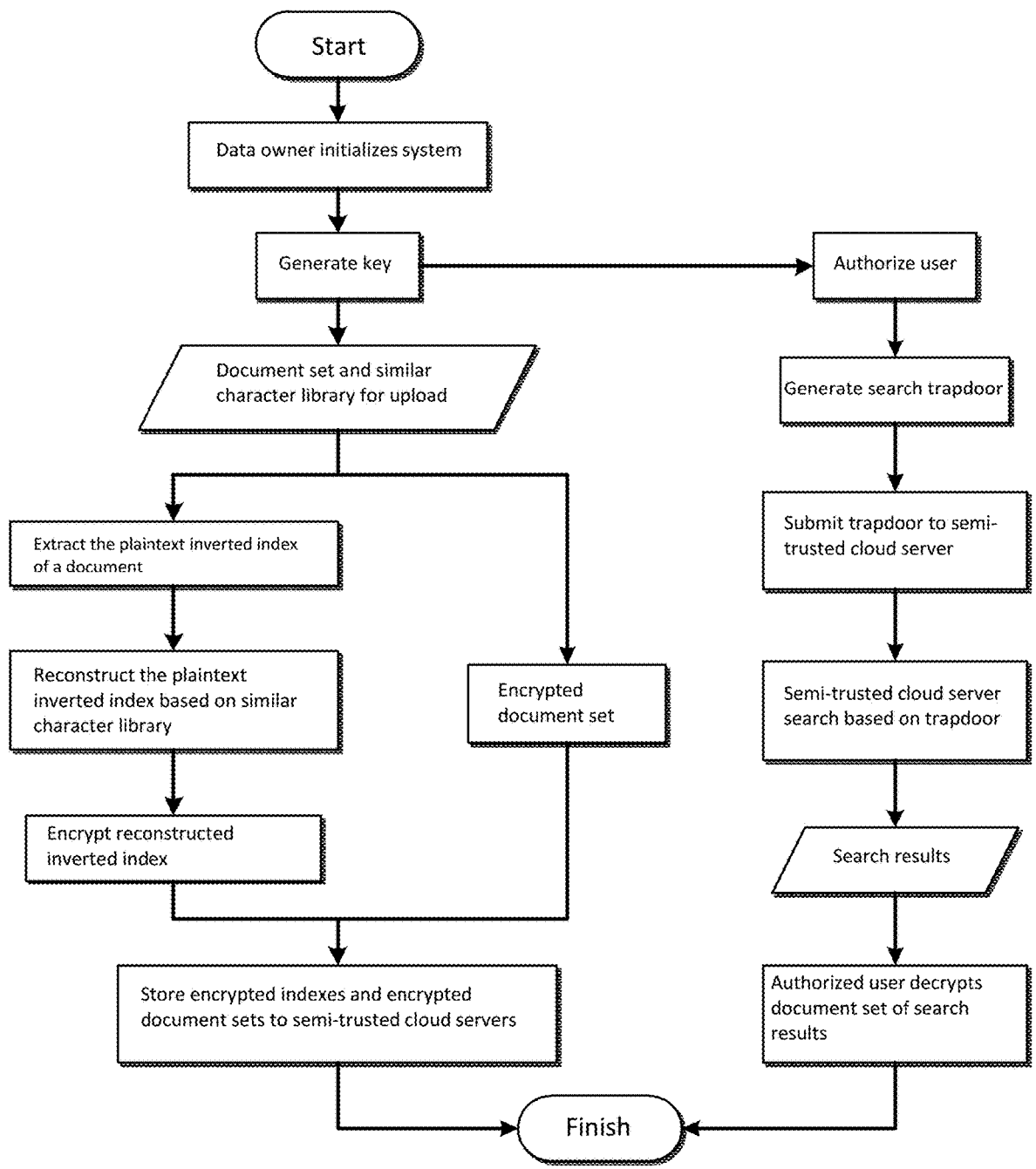
FIG. 1 is a flowchart showing a full-text fuzzy search method for similar-form Chinese characters in the ciphertext domain disclosed in the present invention.

As shown in FIG. 1, a full-text fuzzy search method for similar-form Chinese characters in the ciphertext domain specifically comprises:

S1, generate the inverted index, use the distributed search engine Lucene and the Chinese word segmentator IKAnalyzer to perform full-text segmentation on the uploaded document set, obtain the plaintext inverted index of the set of documents to be uploaded, construct the similar-form Chinese character dictionary library by analysing the commonly used Chinese characters, and use the similar-form Chinese character dictionary library to expand the plaintext inverted index of the set of documents to be uploaded;

S2, data encryption, given the security parameter k, the data owner establishes the searchable encryption key $K_{index}=(K_1,K_2)$ according to the security parameter k, to encrypt and construct the ciphertext index; establish the symmetric encryption key $K_{enc}$ to encrypt documents to be uploaded; use the searchable encryption key $K_{index}$ to encrypt the inverted index obtained in step 2, and use the symmetric encryption key $K_{enc}$ to encrypt documents to be uploaded;

S3, user authorization, the data owner divides the searchable encryption key $K_{index}$ into $(K_u, P_u)$, sends $K_u$ to authorized users, and uses $P_u$ as a server verification parameter to complete user authorization;

S4, search documents, the user takes the key group $K_u$ and the keyword w to be searched as input, generates the search trapdoor, and submits the search trapdoor to the cloud server; the cloud server verifies the trapdoor by encrypting the ciphertext index, and returned to the user the document sequence corresponding to matched encrypted documents and fuzzy keywords, if similar-form words of the search keyword are included in the document set, the document containing the search keywords will be ranked before a document with its similar-form words in search results.

The process of step S1 is as follows:

S11, establish the unique identifier set FILE(flie$_1$, flie$_2$, . . . , flie$_n$) of documents to be uploaded, where n represents the number of documents to be uploaded;

S12, use the distributed search engine Lucene and the Chinese word segmentator IKAnalyzer to perform full-text segmentation and filtering on the uploaded document set, and the result of the word segmentation result is (w$_1$', w$_2$', . . . , w$_p$'), where p is the length of the inverted index, each document set is the inverted index EnIndex$_{file}$=(w$_1$', w$_2$', . . . , w$_p$');

S13, collect 3755 commonly used Chinese characters, establish a commonly used Chinese character dictionary, and expand it into a similar-form Chinese character dictionary library DICT by collecting and analysing the commonly used similar-form Chinese characters;

S14, traverse the keyword w' in the inverted index, if the keyword has the similar-form word, expand the w' to w=(w', w$^1$, w$^2$, . . . , w$^m$) by using DICT, where (w$^1$, w$^2$, . . . , w$^m$) is the set of similar-form words of w', m represents the number of similar-form words of w; if w' does not have a similar-form word, then w=w';

S15, update the plaintext inverted index as EnIndex$_{file}$= (w$_1$, w$_2$, . . . , w$_p$).

The process of step S2 is as follows:

S21, according to the security parameter k, the data owner randomly generates the k-bit searchable encryption key $K_{index}=(K_1,K_2)$ and the symmetric encryption key $K_{enc}$ locally;

S22, encrypt the inverted index EnIndex$_{file}$=(w$_1$, w$_2$, . . . , w$_p$) generated in step 2 as the index keyword by using $K_{index}$, and the encryption of the index uses the chain structure, which is w→Enc(flie$_1$)→Enc(flie$_2$)→ . . . →Enc (flie$_x$), when w=(w', w$^1$, w$^2$, . . . , w$^m$) is a set of multiple similar-form words, for each similar-form word, firstly link the document corresponding to the word, and then sequentially link documents corresponding to other words, which ultimately generates the encrypted ciphertext index for all index keywords;

S23, perform symmetric encryption operation on all the documents to be uploaded by using the symmetric encryption algorithm, and the symmetric encryption key is $K_{ene}$, use the unique identifier set FILE(flie$_1$, flie$_2$, . . . , flie$_n$) to correspond to the ciphertext document, and then construct a B+ tree as the index into the unique identifier of the ciphertext document.

The process of step S3 is as follows:

S31, the data owner divides $K_{index}$ into a user key group $K_u$ and a server verification parameter $P_u$ by an exclusive OR operation;

S32, the data owner sends the user key group $K_u$ to an authorized user, the authorized user generates the search trapdoor by using the key group $K_u$ and the search keyword w, and the data owner sends the server verification parameter $P_u$ to the cloud server, in order to verify the correctness of the user's search trapdoor;

S33, when the data owner revokes the authority, requests to the server to delete the authentication parameter $P_u$, at this time the search trapdoor generated using the user key group $K_u$ whose authorisation is revoked will be invalidated.

The process of step S4 is as follows:

S41, the authorized user generates the search trapdoor by using the key group $K_u$ and the search keyword w, and submits the trapdoor to the cloud server;

S42, the cloud server uses the verification parameter $P_u$ to XOR the search trapdoor, the XOR result matches the searchable ciphertext index, and the matching result is calculated to obtain the ciphertext unique identifier set (flie$_1$, flie$_2$, . . . , flie$_i$), where i represents the number of files corresponding to the keyword, searches for the specified identifier in the B+ tree to obtain the encrypted document set, and returns the encrypted document to the authorized user.

Figure 2:
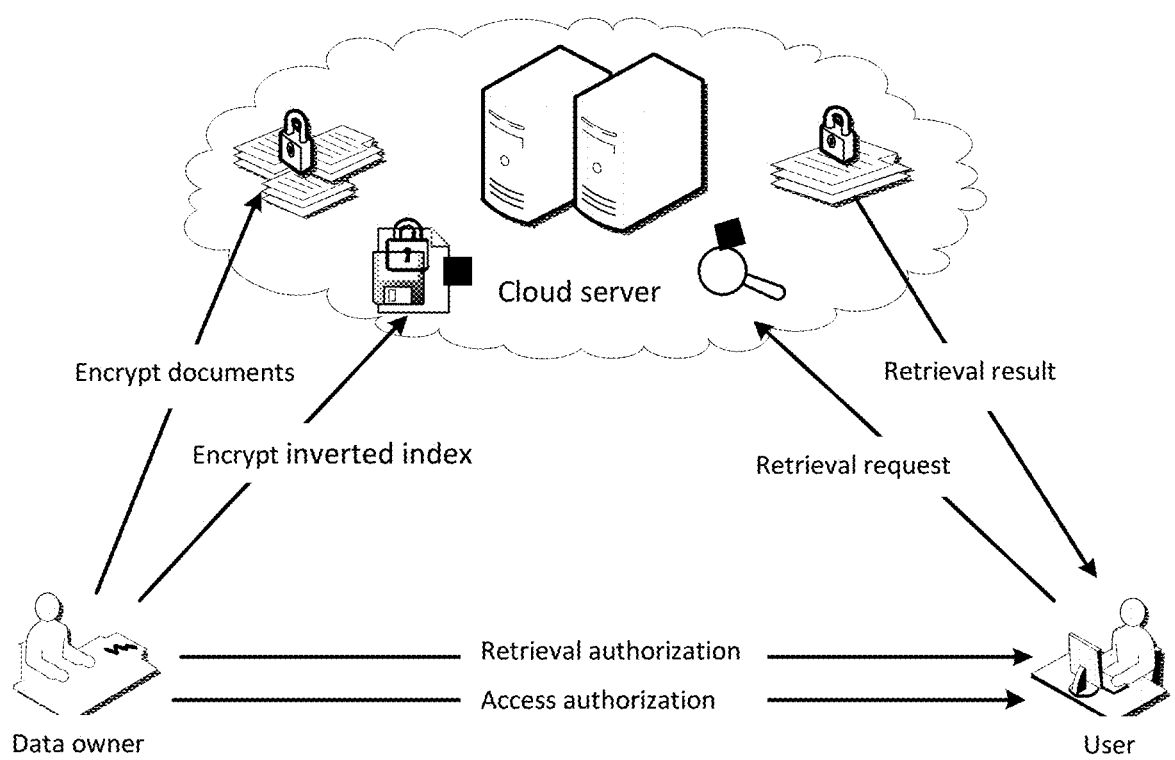
FIG. 2 is a schematic diagram of an application structure showing a full-text fuzzy search method for similar-form Chinese characters in the ciphertext domain disclosed in the present invention.

FIG. 2 is a schematic diagram of an application structure showing a full-text fuzzy search method for similar-form Chinese characters in the ciphertext domain disclosed in the present invention, as shown in FIG. 2, in which, The data owner is used to generate the dictionary of similar-form Chinese characters that is used in the scheme, this dictionary determines the accuracy of full-text fuzzy inquiry of similar-form Chinese characters in the ciphertext domain; extract the full-text keywords for each document in the plaintext set, and according to the similar-form Chinese character dictionary, the similar-form words' fuzzy processing is performed on each keyword of each document; the document set to be uploaded is symmetrically encrypted, and the encrypted ciphertext index is generated by using fuzzy keywords and corresponding ciphertext documents; upload encrypted document set and ciphertext index to cloud server;

The authorized user, when search documents, according to the keyword to be searched, encrypts multiple keywords by the authorized user's key group to generate a search trapdoor, and sends the trapdoor to the cloud server; during the search phase, the cloud service will do checking computation on the trapdoor, and the server will return the corresponding matched encrypted document set; if there is no document corresponding to the keyword or the authorized user key group is incorrect, the server will have no return value; finally, the authorized user downloads the matched ciphertext document set, and decrypts the document into the plaintext document set by using the document decryption key;

The cloud server is configured to store the ciphertext document and the encrypted ciphertext index uploaded by the data owner; during the search phase, obtains the trapdoor information of the authorized user, calculates the transformation and iterates the transformed result in the ciphertext index, then stores the unique identifier of each document obtained in the output set; transmits all the ciphertext sets corresponding to the document unique identifier to the authorized user, and no response to the user if the output set is empty.

In summary, the present invention mainly comprises generating the similar-form Chinese characters dictionary, document full-text segmentation, document keyword extension, document encryption, and completing the fuzzy search in the ciphertext domain. In the initialization process, the data owner constructs the similar-form Chinese characters dictionary library by collecting the common similar-form Chinese characters, then establishes the plaintext inverted index for the documents that need to be uploaded to the cloud service, and reconstructs the plaintext inverted index by using existing similar-form words dictionary library, then uses the random number generator to generate the keys required for initialization, finally encrypts the plaintext inverted index and the document set to be uploaded, and uploads the encrypted index and the encrypted document set to the semi-trusted cloud server; the authorized user generates search trapdoors with the authorized keys and search keywords w, when the user request the query, the search trapdoors are uploaded to the cloud server; the cloud server performs calculation operations through trapdoors, matches and iterates the calculation results with the encrypted index, and finally returns the document set of the search results to the requesting user; finally the user decrypts the document using the document key.

The above embodiment is a preferred embodiment of the present invention, but the embodiment of the present invention is not limited by the above embodiment. Any other changes, modifications, substitutions, combinations, and simplifications made without departing from the spirit and principle of the present invention, all should be equivalent substitute methods, and included in the protection scope of the present invention.

The invention claimed is:

1. A full-text fuzzy search method for similar-form Chinese characters in a ciphertext domain, the method performed by a system and comprising the following steps:

S1.1, establishing a unique identifier set FILE(flie$_1$, flie$_2$, . . . flie$_n$) of documents to be uploaded, where n represents the number of documents to be uploaded;

S1.2, using a distributed search engine Lucene and a Chinese word segmentator IKAnalyzer to perform a full-text segmentation and a filtering on an uploaded document set, generating a plaintext inverted index EnIndex$_{file}$=(w'$_1$, w'$_2$, . . . w'$_p$) of the document set, where p is a length of the inverted index;

S1.3, establishing a commonly used Chinese character dictionary based on N commonly used Chinese characters, and expanding it into a similar-form Chinese character dictionary library DICT based on commonly used similar-form Chinese characters, where N is a positive integer;

S1.4, traversing a keyword w' in the inverted index, when the keyword has a similar-form word, expanding the w' to w=(w', w$^1$,w$^2$, . . . ,w$^m$) by using DICT, where (w$^1$, w$^2$, . . . , w$^m$) is a set of similar-form words of w', m represents the number of similar-form words of w; when w' does not have a similar-form word, then w=w';

S1.5, updating the plaintext inverted index as EnIndex$_{file}$= (w$_1$, w$_2$, . . . w$_p$);

S2, using a random number generator to establish a searchable encryption key K$_{index}$=(K$_1$, K$_2$) and a symmetric encryption key K$_{enc}$ according to a security parameter k; using the searchable encryption key K$_{index}$ to encrypt the inverted index and construct a ciphertext index, and using the symmetric encryption key K$_{enc}$ to encrypt documents to be uploaded;

S3, dividing the searchable encryption key K$_{index}$ into (K$_u$, P$_u$), sending a key group K$_u$ to an authorized user, and using P$_u$ as a server verification parameter to complete user authorization;

S4, generating a search trapdoor when the user takes the key group K$_u$ and a keyword w to be searched as input, and submitting the search trapdoor to a cloud server; the cloud server verifying the trapdoor by encrypting the ciphertext index, and returning to the user a document sequence corresponding to matched encrypted documents and fuzzy keywords, when similar-form words of the search keyword are included in the document set, a document containing the search keywords is ranked before a document with its similar-form words in search results.

2. The full-text fuzzy search method for similar-form Chinese characters in the ciphertext domain according to claim 1, wherein the process of step S2 is as follows:

S2.1, using the random number generator, according to the security parameter k, randomly generating a k-bit searchable encryption key K$_{index}$=(K$_1$, K$_2$) and the symmetric encryption key K$_{enc}$ locally;

S2.2, encrypting the inverted index EnIndex$_{file}$=(w$_1$, w$_2$, . . . ,w$_p$) as an index keyword by using K$_{index}$, and the encryption of the index uses a chain structure:

$$w \rightarrow Enc(\text{flie}_1) \rightarrow Enc(\text{flie}_2) \rightarrow \ldots \rightarrow Enc(\text{flie}_x),$$

when w=(w', w$^1$,w$^2$, . . . ,w$^m$) is a set of multiple similar-form words, for each similar-form word, firstly linking the document corresponding to the word, and then sequentially linking documents corresponding to other words, which ultimately generating an encrypted ciphertext index for all index keywords;

S2.3, performing symmetric encryption operation on all the documents to be uploaded by using a symmetric encryption algorithm, and a symmetric encryption key is K$_{enc}$, using the unique identifier set FILE(flie$_1$, flie$_2$, . . . ,flie$_n$) to correspond to a ciphertext document, and then constructing a B+tree as an index into the unique identifier of the ciphertext document.

3. The full-text fuzzy search method for similar-form Chinese characters in the ciphertext domain according to claim 1, wherein the process of step S3 is as follows:

S3.1, dividing K$_{index}$ into the key group K$_u$ and the server verification parameter P$_u$ by an exclusive OR operation;

S3.2, sending the key group $K_u$ to the authorized user, and sending the server verification parameter $P_u$ to the cloud server, in order to verify the correctness of the search trapdoor;

S3.3, when the data owner revokes the authority, requesting the server to delete the authentication parameter $P_u$, at this time the search trapdoor generated using the key group $K_u$ whose authorization is revoked will be invalidated.

4. The full-text fuzzy search method for similar-form Chinese characters in the ciphertext domain according to claim 1, wherein the process of step S4 is as follows:

S4.1, generating the search trapdoor by using the key group $K_u$ and the search keyword w, and submitting the trapdoor to the cloud server;

S4.2, the cloud server using the verification parameter $P_u$ to XOR the search trapdoor, the XOR result matching the searchable ciphertext index, and the matching result is calculated to obtain a ciphertext unique identifier set ($flie_1, flie_2, \ldots, flie_i$), where i represents the number of files corresponding to the keyword, searches for the specified identifier in the B+tree to obtain an encrypted document set, and returns the encrypted document to the authorized user.

5. The full-text fuzzy search method for similar-form Chinese characters in the ciphertext domain according to claim 1, wherein the number of commonly used Chinese characters N is 3755.

* * * * *